May 13, 1941.  B. C. BAADE  2,241,757
VEHICLE
Original Filed May 5, 1934   6 Sheets-Sheet 1

Inventor
BRUNOLF C. BAADE.

May 13, 1941.   B. C. BAADE   2,241,757
VEHICLE
Original Filed May 5, 1934   6 Sheets-Sheet 2

Inventor
BRUNOLF C. BAADE.

By

Attorney

May 13, 1941.  B. C. BAADE  2,241,757
VEHICLE
Original Filed May 5, 1934   6 Sheets-Sheet 3

Inventor
BRUNOLF C. BAADE

By

Attorney

May 13, 1941.         B. C. BAADE         2,241,757
VEHICLE
Original Filed May 5, 1934      6 Sheets-Sheet 4

Inventor
BRUNOLF C. BAADE.

May 13, 1941. B. C. BAADE 2,241,757
VEHICLE
Original Filed May 5, 1934 6 Sheets-Sheet 6

Inventor
BRUNOLF C. BAADE

Patented May 13, 1941

2,241,757

UNITED STATES PATENT OFFICE 2,241,757

VEHICLE

Brunolf C. Baade, Dessau-Anhalt, Germany, assignor, by mesne assignments, to Wingfoot Corporation, Akron, Ohio, a corporation of Delaware Application May 5, 1934, Serial No. 724,112
Renewed February 8, 1939

4 Claims. (Cl. 105—192)

This invention relates to the construction of wheeled vehicles and is more particularly concerned with the improvement of rail car body structures and the body arrangement relative to the supporting trucks. With the present urge for greater speed in railroad travel and the desire to decrease relatively the driving power while attaining such speed, it becomes necessary to reduce the weight and the air resistance of the cars and at the same time to improve their strength and rigidity. This is of great importance in case of collision or derailment. In the construction of passenger rail cars as well as in freight cars the bottom of the car body is usually above the top of the supporting trucks. Such arrangement, of course, results in a considerable overall height and accordingly is accompanied by much air resistance.

One object of this invention is to avoid high car bodies with their resulting wind resistance and this is accomplished by lowering the car body within a few inches of the rails, thereby giving the car the lowest possible height while maintaining the necessary headroom. This lowering of the car body is accomplished by a novel construction of the car body and trucks and also by an improved car body suspension. The car body is preferably made of strong aluminum alloy and comprises two strong longitudinal beams forming the outer portion of the floor structure between which the trucks are disposed. Transverse members tied together by intermediate longitudinals serve to connect the main longitudinals.

A corrugated sheet metal floor is preferably employed on the frame members and a smooth sheet metal outer cover on the bottom of these members functions to form a very strong and rigid box-like structure with the covering portions thereof being partly omitted at the location of the trucks. The top of the car body is of similar but lighter construction and is connected to the floor structure by rigid side walls. The car body has a cross section of approximately square shape with well-rounded corners and a smooth outer surface with stream-lined ends. The openings for the trucks in the bottom of the body may be covered by a plate on the bottom of the trucks, if maximum reduction of air resistance is required.

The truck frame is preferably a structure of hollow cross-sectional members and is of a sufficiently low height in its center portion so as to permit the use of transverse floor-supporting and truck-aligning beams. Over the length of the trucks the seats may be arranged lengthwise against the sides of the car, thus offering room for the wheels and truck frame. Between the trucks the seats may be arranged transversally.

The car body is resiliently suspended from the trucks through the agency of spring links which are preferably hydraulically controlled. The links are attached to the upper part of the truck frame and to the bottom of the main longitudinals of the car body in a transversally inclined position and permit a limited relative movement of the car body and trucks in all directions. However, a cross bar pivoted in the center of the truck and held, preferably, between rubber-padded brackets which are fastened to the main longitudinals of the car body, functions to prevent longitudinal movements between the trucks and the car body. The resilient connectors however allow a certain side play against resilient buffers and also free relative movement in vertical direction.

The advantages of this car construction include the following:

Very low over-all height of the car and low floor level with resulting low center of gravity and smooth-riding qualities as well as low air resistance.

The loads are carried in a most direct way from the load-carrying side walls of the car body to the truck frames, thereby making it possible to simplify and lighten the truck cor truction while maintaining the same strength. There are no rigid connections which can transmit shocks and vibrations from the truck frame into the car body. Due to the transversally inclined position of the shock-absorbing suspension members, the motion of the car body is almost a pure lateral translation instead of a rolling motion.

The strong outer beams along the floor structure and those along the roof structure give the greatest possible protection against car body damage and to the life of the passengers in case of collision and derailment. Because of the large hollow space of these beams they are well adapted for heating and ventilating purposes.

The different truck arrangements with modifications are shown in the accompanying drawings, one for a single car and one for an articulated car system. In the articulated cars the raised floor level above the trucks may be used for engines, baggage or the like if desired. All cars are made with side entrances and doors are also provided at adjacent ends of the articulated cars.

For a better understanding of the invention reference may now be had to the accompanying drawings forming a part of the specification wherein.

Referring now to the drawings 1 to 5, the car comprises two four-wheel trucks 10, from which the car body 11 is suspended by spring suspension members 12 having flexible joints 13 at each end and being connected to the top of the truck frame 14 and to the bottom of the supporting beam 15 of the car body.

Figure 19:
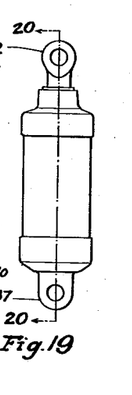
Fig. 19 is a side elevation of a resilient suspension member.
Figure 20:
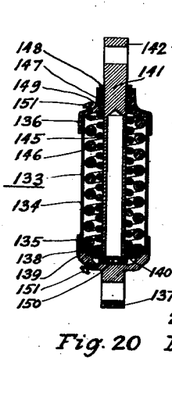
Fig. 20 is a longitudinal cross-sectional view taken on line 20—20 of Fig. 19.

The construction of a single-acting, hydraulically controlled spring suspension member and its functioning is shown in principle in Figures 19 and 20 and described in a later paragraph. Instead of a single acting a double acting suspension member may be employed. Depending on the requirements of the suspension the fastening means at the ends of the suspension members shall be designed and modified as hereafter described.

The truck itself is supported in the usual way by helical springs 16 resting on top of the journal boxes 17 of the wheel axles 18.

A cross beam 19, turnably mounted on the truck by a center pin 20 engages slidably between two brackets 21 attached to the inside of each of the main longitudinal car-body beams 15 and insures the relative longitudinal position of the truck 10 and the car body 11. Whereas there is practically no play longitudinally between the brackets and the cross beam, there is sufficient play laterally for the necessary side movements in curves. A resilient cushion 22 is provided for limiting too large side movements, which are mainly checked by the suspension members 12. The truck at the other end of the car, of which little is seen in the drawing, is similar to that just described and carries the engines and driving gear which are of standard design.

A modification of the car body suspension and of the truck driving beam which controls the relative position of the truck and the car body is shown in Figures 11 to 15.

Instead of arranging the suspension members, indicated in these views at 85, parallel to each other, they are inclined in such a way that their axes intersect in one point with the vertical axis of the trucks. Such construction has the advantage that turning of the truck about its center will stress all suspension members alike, that is, all members will elongate the same amount, whereas with the parallel arrangement, one member will decrease and one adjacent to it increase its length as will be understood.

To insure proper flexible turning and working the suspension members 85 are connected to brackets 86 on top of the truck frame 87 and to brackets 88 at the bottom of the supporting beam of the car body, respectively through the agency of flexible universal joints 89. The truck driving beam or cross beam 90 is slidably carried at its ends in vertical guides 91 secured to the car body, and is provided at each end with a resilient buffer. The buffer consists of a cylinder 92 which is inserted in the hollow end of the driving beam 90 and of a hollow piston 94 sliding in the cylinder 92. The piston is pressed by hydraulically assisted or controlled springs 93 against the vertical guides of the car body and acts together with the inclined suspension members 85 to keep the car body from moving too much laterally. A rubber cushion 95 between the cylinder end 96 and a stop web 97 of the driving beam serves as an additional shock damper.

Figure 1:
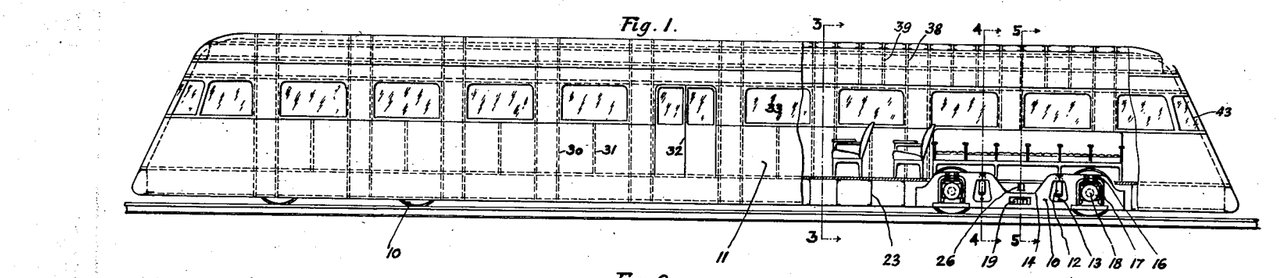
Fig. 1 is a side elevation of a single type railway car embodying the invention with portions of the car being broken away to better illustrate the invention.
Figure 2:
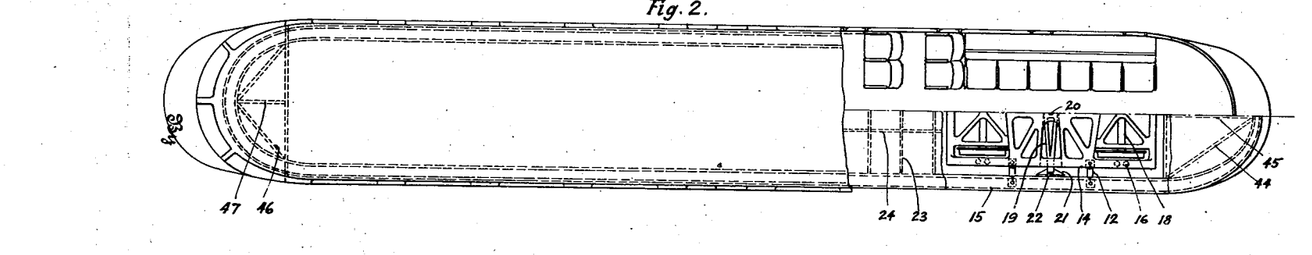
Fig. 2 is a plan view of the railway car shown in Fig. 1 with a portion on one side thereof being broken away to show the seating arrangement, and a portion on the other side being broken away to show the arrangement of the trucks.
Figure 3:
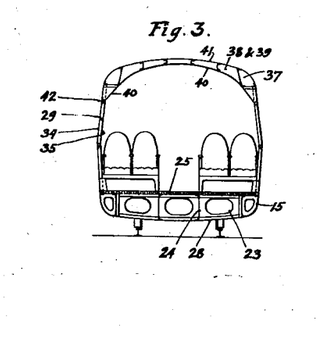
Fig. 3 is a cross-sectional view taken on line 3—3 of Fig. 1 showing the transversally arranged seats.
Figure 4:
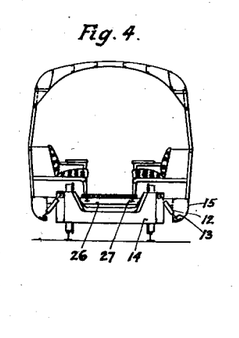
Fig. 4 is a cross-sectional view taken on line 4—4 of Fig. 1 illustrating the suspension of the car body.
Figure 5:
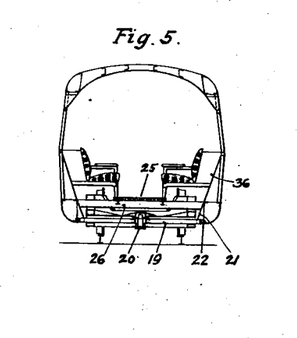
Fig. 5 is a cross-sectional view taken on line 5—5 of Fig. 1 which illustrates the construction of the trucks.
Figure 6:
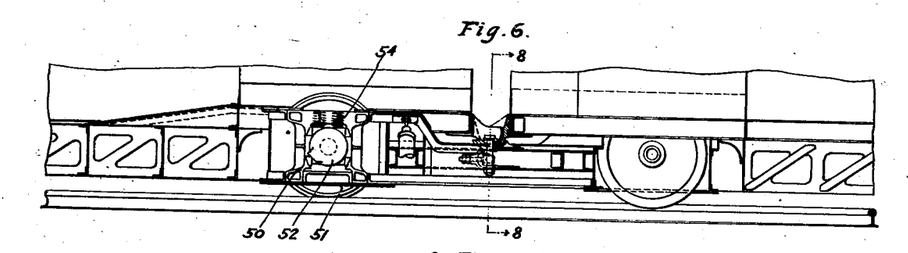
Fig. 6 shows the connection of articulated railway cars; the left side of the figure being a longitudinal section in front of the truck and the right side of the figure being a longitudinal section in the center of the car.
Figure 7:
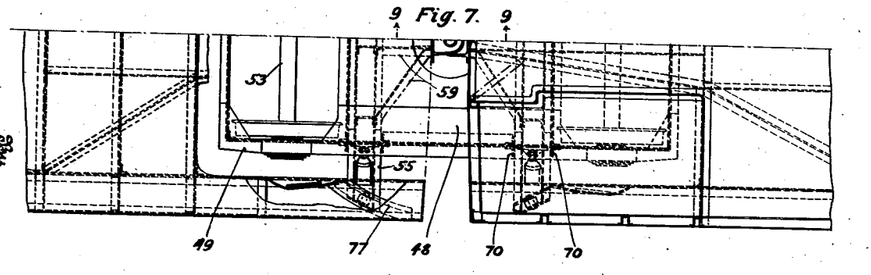
Fig. 7 is a plan view of Fig. 6; on the left side of the figure a portion of the car body is broken away to better show the truck while the right side of the figure shows a section of the car body above the floor.
Figure 8:
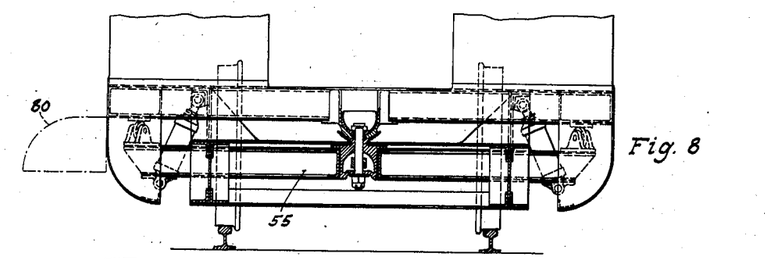
Fig. 8 is a transverse cross-sectional view through the universal joint of the articulated cars and is taken on lines 8—8 of Fig. 6.
Figure 9:
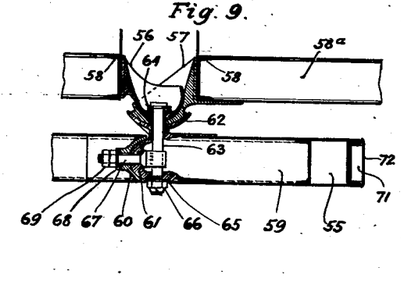
Fig. 9 is a longitudinal cross-sectional view taken on line 9—9 of Fig. 7.
Figure 10:
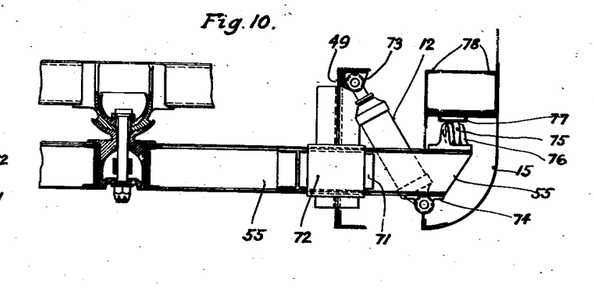
Fig. 10 is a transverse cross-sectional view of the universal joint similar to Fig. 8 but in larger size, showing also the supporting member of the car body.
Figure 11:
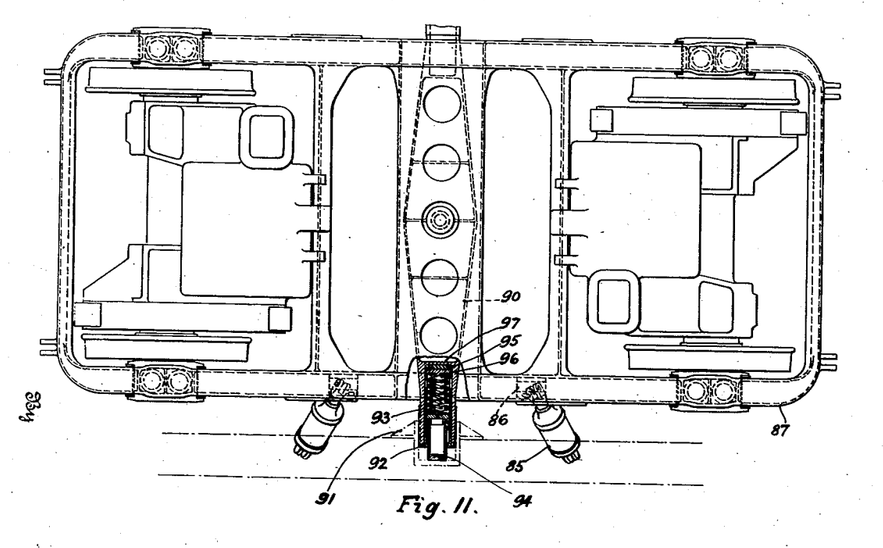
Fig. 11 illustrates in larger size a plan view of a modification of a car truck of the single car type.
Figure 12:
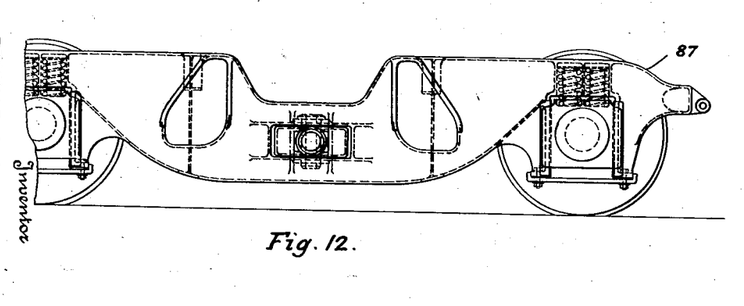
Fig. 12 is an elevation and Fig. 13 an end view of the car truck shown in Fig. 11.
Figure 13:
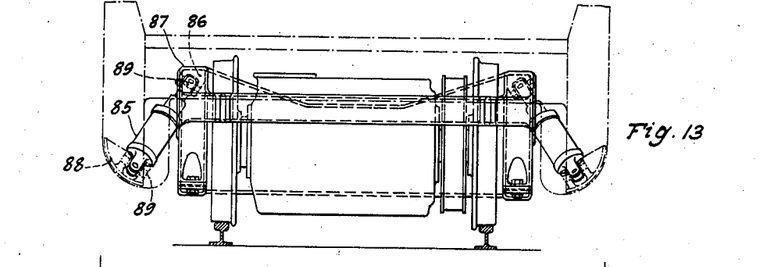
Figures 14, 15:
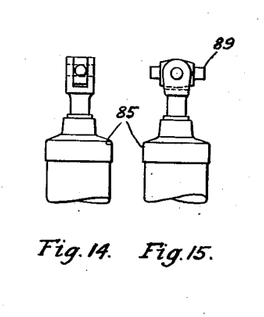
Figs. 14 and 15 are side and end views, partly broken away, of the resilient suspension member provided with a universal joint.

The car body 11 includes a floor structure consisting of two outer longitudinal box girders or beams 15 which are connected by transverse members 23. Intermediate longitudinals 24 are employed to interconnect the transverse members 23 and the longitudinals 24 are flush at the top and bottom with the members 23 and the various members serve to support the floor 25 which rests as well on the outer longitudinal beams 15. The floor above the trucks is supported by a heavy transverse beam 26 connecting special shallow intermediate longitudinal beams 27 and the top of the truck frame is cut out in the center to provide clearance for these beams as seen in Fig. 1. The bottom of the floor structure is also provided with a sheet metal cover 28 which, together with the floor, forms a flat box-like girder construction which provides a very strong, rugged and stiff bottom for the car body.

The side walls 29 of the car are formed of posts 30 with intermediate stiffening members 31, said post and members being positioned to provide entrance doors 32 and windows 33. Inside and outside sheet metal covering 34 and 35 connect the aforesaid members to form a rigid wall, which is braced at the bottom against the floor structure by braces 36.

For reasons of strength and stiffness, the curved top structure of the car body is also provided with longitudinal box girders 37 at the corners, which are connected by transverse members 38 and intermediate supports 39. Inside and outside metal sheeting 40 and 41 secures the members into a strong roof unit, the inside cover 40 of which reaches down to the upper window frame 42.

The front and rear ends of the car are given stream-line shape and are provided with stiffening members 43 between the floor and roof structures. In order to withstand forces in longitudinal directions the ends of the floor and roof structures are reinforced by braces 44, 45 and 46 and 47, which connect the ends of the roof and floor structures with the longitudinal strengthening members.

Figs. 6 to 10 illustrate how the articulated cars are connected together with the aid of a single four-wheel truck at each connection. In these figures of the drawings the truck is indicated generally at 48 and comprises a frame 49, constructed of sheet steel and structural bars, including the journal box housings 50 advantageously made of castings. Members 51 close the journal housing at the bottom. The truck frame is supported in the usual way by helical springs 54 carried on journal boxes 52 which journal the wheel axles 53. Transverse supporting beams 55 also made of structural or cast material extend laterally through openings in the truck frame so that their ends extend through suitable apertures into the longitudinal outer supporting beams 15 of the car body. The beams 55 are also provided with longitudinally extending bracket members 59 which are secured to a double ball-and-socket joint. The double socket joint includes parts 56 and 57 which are fastened to the end beams 58 of the car bodies by braces 58ª. The ends of the longitudinal extensions 59 of the transverse supporting beams 55 are provided with ball joint members 60 and 61, respectively, the latter extending vertically into a concave ball-shaped flange 62, which fits to the ball-shaped bottom of the ball joint member 57. The ball joint members 56 and 57, coupling the car bodies and the end piece 61 being one with the flange 62, are pivotally held together by a vertical pin 63, which includes a washer 64, washer 65 and crown nut 66.

The horizontally extending ball joint members 60 and 61 of the brackets 59 and transverse beams 55 are joined together by an eyebolt 67, the eye of which embraces the vertical pin 63 and which is secured by a ball-shaped washer 68 and nuts 69. The universal ball joints thus arranged will permit the articulated cars to swing about sufficiently in all directions.

Where the transverse supporting beams 55 pass through the side walls of the truck frame, the side walls are provided with guide flanges 70 having a sliding fit with the transverse beams which are equipped on both sides, opposite the guide flanges with rubber pads 71 protected by metal plates 72. The outer ends of the cross beams 55 are supported by the spring links 12 which are hinged at one end to brackets 73 fastened to the upper part of the truck frame 49 and at the other end to brackets 74 secured underneath the transverse beams. Rollers 75, which are supported by brackets 76 located on top at the outer ends of the transverse beams, bear against circular rail segments 77 fastened to the longitudinal supporting beams of the car body and having the vertical ball joint as center of rotation. In order to be able to mount the car body on the transverse supporting beams, the end portions of the longitudinal supporting beams are made removable. For example they may be arranged to be swung out of position on a hinge structure as is diagrammatically shown in dotted lines as at 80 in Fig. 8. Channel members 78 are accordingly embodied in the car body structure at least over the trucks and they serve as actual car-body supports and take the place of the removable end portion of the longitudinal supporting beams at the ends of the car or over the trucks. A modification of the car-truck constructions and car-body suspensions shown in the Figures 1 to 5 and 6 to 10 is represented by the Figures 16 to 18 for the single car truck and by the Figures 21 to 23 for the articulated car truck.

Figure 16:
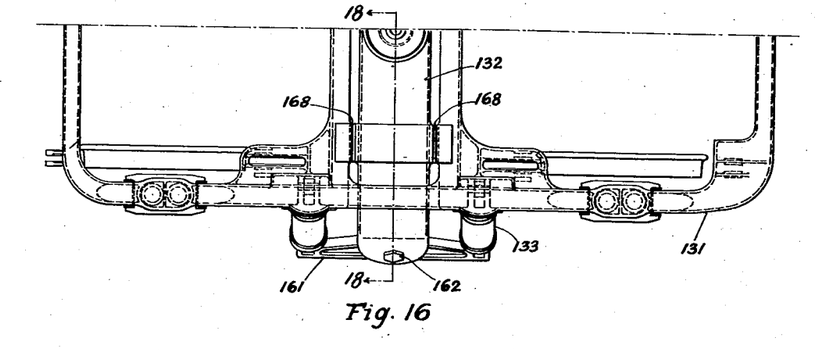
Fig. 16 is a plan view of a car truck for single type cars, showing the car body connected and supported in the conventional way by a car bolster and the car bolster supported according to this invention.
Figure 17:
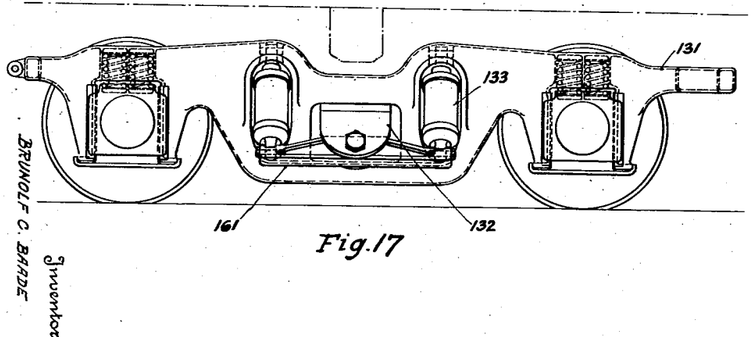
Fig. 17 is a side view of Fig. 16.
Figure 18:
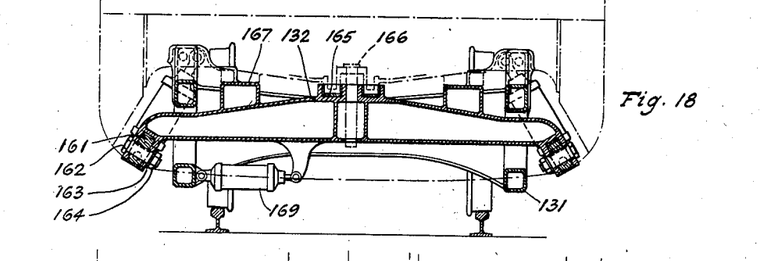
Fig. 18 is a cross-sectional view taken on the lines 18—18 of Fig. 16.

For the single car truck, the truck frame 131 is preferably constructed in the form of a casting and is mounted on two pairs of wheels as heretofore described in conjunction with Figures 7 and 8.

The truck carries a car-body supporting bolster by means of suspension members 133. This is accomplished by employing two suspension members 133 which are hinged at both sides to the top of the truck frame 131 and are connected at their lower ends by equalizing bars 161. For making some adjustments in the car body suspension the top of the truck frame is provided with two suspension points close together transversally for each suspension member. The supporting bolster 132 rides in the center of the equalizing bars to which it is secured by bolts 162, spring washers 163 and nuts 164. The car body, indicated in phantom lines, rests on the bolster center bearing 165 to which it is secured by a king pin 166 and supported by laterally arranged bearings 167. The bolster 132 is held in position, relative to the truck frame by bearing surfaces 168 at front and rear. In lateral and vertical direction, however, the car-body supporting bolster can move as far as the suspension members, which are inclined laterally and outwardly from the top, will permit. An additional lateral motion-restrictive means may be provided, as seen in Fig. 19, by utilizing resilient members 169, which are alike or similar in construction to the suspension members and which connect the truck bolster with the truck frame.

Figure 21:
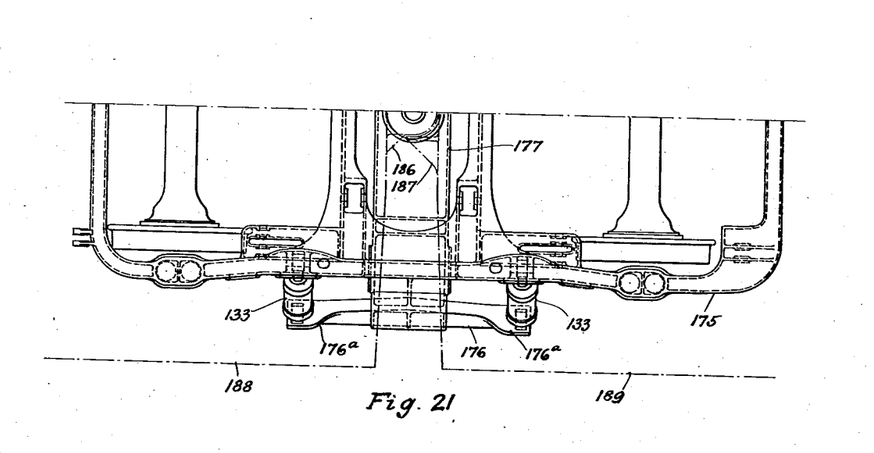
Fig. 21 is a plan view of a modification of an articulated car truck corresponding to that shown in Figs. 16 to 18 for the single car truck.
Figure 22:
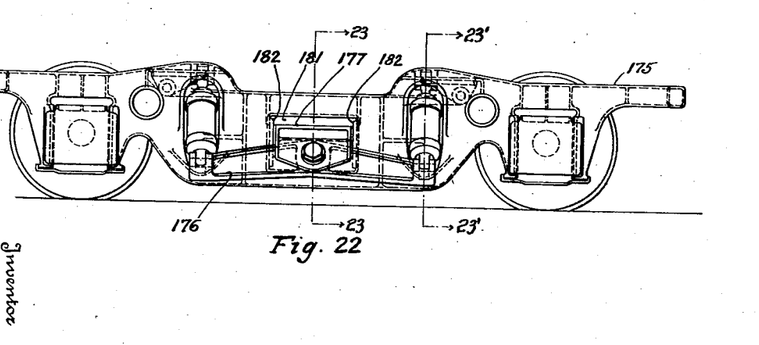
Fig. 22 is a side view of the car truck shown in Fig. 21.
Figure 23:
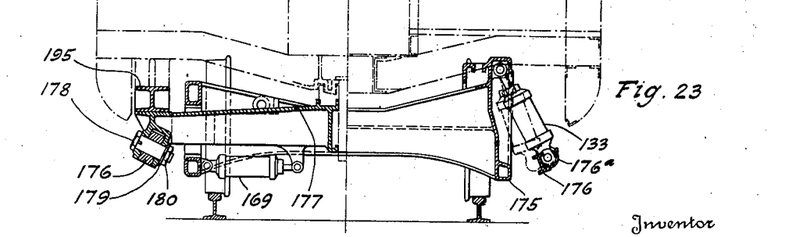
Fig. 23 shows on the left side a cross-sectional view taken on lines 23—23 of Fig. 22 and on the right side a cross-sectional view taken on lines 23'—23' of Fig. 22.

The articulated car truck shown in Figs. 21 to 23 is quite similar in construction to that employed for the single car type and just described.

In the articulated embodiment of the invention the truck frame is indicated at 175 and is preferably made of cast steel with the truck being journaled on two wheel axles as heretofore described. Suspended from the top at both sides of the truck are two resilient suspension members 133 laterally inclined towards the outside. The suspension members at each side have their bottom ends connected by an equalizing bar 176, and for the purpose of making the suspension somewhat adjustable the bar 176 may have integral fastening brackets 176ᵃ which extend laterally from only one side at both ends of the bar 176. The equalizing bar 176 can be secured to the car-body bolster 177 with the brackets 176ᵃ extending either outwardly or inwardly whereby as seen in full and dotted lines in Fig. 23 the angularity of the suspension cylinders 133 can be changed. The equalizing bars 176 are connected to the car body supporting bolster 177 by means of a pin 178 which is secured by a lock washer 179 and a nut 180. The supporting bolster passes through openings 181 in the truck side-frame on which vertical guides 182 are provided permitting the bolster to slide in the vertical plane but permitting no longitudinal motion relative to the truck frame.

The supporting bearings 186 and 187, extending over the ends of the adjacent articulated car-body sections 188 and 189, respectively, fit into each other and into the central bearing 190 of the truck bolster 177 to which they are secured by a king pin 191 about which the car-body sections pivot. Side bearings 195 located on top at the outer ends of the truck bolster 177 support the sides of the car bodies.

The side motion of the car bodies relative to the truck is mainly controlled by the resilient suspension members. These members may be assisted by transverse shock absorbers 169 which preferably are of similar construction to those used as suspension members.

The power plant for the single or articulated car may advantageously consist of an internal combustion engine of the Diesel type, driving an electric generator which supplies the generated current to motors mounted adjacent the driving truck axles.

Throughout the description of the various embodiments of the present invention, reference has been made to suspension members. A satisfactory type of suspension device is seen in detail in Figs. 19 and 20 and may comprise a cylinder 134 having threaded ends onto which are screwed the cylinder heads 135 and 136. The lower cylinder head 135 is fully closed and carries a suspension lug 137, whereas the upper cylinder head 136 is provided with an opening for a piston rod 141.

Secured to the rod 141 is a piston 138 formed with a check-valve-controlled orifice 139 and a smaller unobstructed orifice 140. The piston rod 141 may be provided with an eye 142 at its outer end. Two springs 145 and 146 are positioned between the upper cylinder head 136 and the piston 138. The passage for the piston rod through the upper cylinder head is sealed by a packing 147 which is held in place against a shoulder ring 149 by the threaded sleeve 148. The open end of the hollow piston rod is closed by a threaded plug 150. Both cylinder heads are provided with oil filter plugs through which the cylinder is filled with oil.

When not under load the piston is pressed by the springs against the lower cylinder head. As soon as the suspension members are subjected to a load greater than is the spring pressure in the unextended position of the piston, then the oil on the one side of the piston is pushed through the orifices in the piston to the other side without too much obstruction, since the ball check valve opens to let the oil pass through. In the return stroke, however, the oil can pass back only through the small orifice left open while the check valve is closed. This has a great dampening effect upon the spring action and will dampen the resonance of the springs.

It should be understood that in the articulated car system the ends of the cars which are not adapted to be connected together will be constructed substantially in accordance with the teachings of the invention as disclosed in regard to the single car. Thus the truck and the connection therewith as shown in Figs. 1 to 5 may be employed on the front and back ends (not shown) of the articulated cars partially illustrated in Figs. 6 to 10.

From the foregoing description it is believed that the operation and structure of the improved single car and articulated car will be understood. It will be appreciated therefore that by the present invention a car construction has been provided in which the body of the vehicle is lowered until it just clears the top of the rails or other supporting means whereby the overall height is considerably reduced as compared with known types of cars and vehicles. The car body in a preferred embodiment comprises four longitudinally extending hollow box-like girders which are very strong and yet quite light as compared with prior known reinforcing means and structures, particularly when the box girders and the rest of the body is constructed from light-weight metal, such as duralumin.

The girders are incorporated with the bottom and top of the car body so that two distinct flat boat-like enclosed members are provided, which in themselves act as box-shaped girders so that a very strong integral structure is provided while maintaining the weight as low as possible. The bottom and top portions of the body are secured together by vertically extending members to produce an integral car structure in which the strength members are positioned to best carry the stresses imposed thereon.

By the present invention the truck supporting the car body are positioned in suitable openings provided in the bottom box-like portion of the body so that the body is simultaneously held in a low position and the trucks themselves are so positioned within the car body itself as to reduce wind resistance to a minimum. The cover over the bottom of the car also would insure a smooth air flow beneath the car. The ends of the car body as indicated in the drawings are of aerodynamically favorable shape and the entire vehicle is rounded in contour and provided with a smooth outer surface so that undesirable eddy currents and the like are eliminated and avoided, with a resulting structure which requires a minimum of power to attain a maximum of speed.

The vehicle body is resiliently mounted upon the trucks by a plurality of resilient, preferably hydraulic, devices that extend downwardly from the truck to the longitudinal girders of the vehicle body bottom so that an improved resilient connection is provided between the truck and body. The resilient suspension members being positioned in a downwardly extending and also a transverse position function to absorb both vertical and lateral shocks on the truck, thereby resulting in a smooth cushioned ride which is quite free from rocking movement. The spring constants can be so selected as to prevent resonance of vibrations between car body and truck.

In accordance with the present invention the cars in the articulated type are coupled together by a single king pin arrangement which simultaneously secures the trucks and the car bodies so that stresses between the cars are distributed to and carried by both the trucks and vehicle bodies. The articulated car also includes a novel cross member associated with a truck which extends into the longitudinal girders at the bottom corners of the car body where rotatable arcuate bearing means are provided to permit relative swinging movement of the car body and the truck. This arrangement of parts results in an additional support or tie in between the truck and the vehicle body.

Moreover the car design as a whole has been improved, the frame has been lightened and strengthened, the relation of seats, working parts and the like has been bettered, the truck design and support has been added to, resulting in a new and better vehicle.

Substantially all the showings and description herein have related to vehicles for use on rails, however it should be understood that many of the principles of the present invention are broadly applicable to use with any type vehicle having rolling support.

While in accordance with the patent statutes only certain types of the present invention have been specifically illustrated and described it will be understood that the invention is not limited thereto or thereby but is defined in the appended claims.

What I claim is:

1. In combination with a car body of a wheeled truck for carrying said body, and a plurality of means interposed between said body and truck for resiliently controlling the movement of said body relative to said truck, each comprising a suspension member pivotally attached to said truck, a suspension member pivotally connected to said body, a resilient means arranged between said members and between their points of connection with said truck and body, said members having portions thereof engaging said resilient means to compress the same as said points of pivotal support of said members move away from each other, the points of pivotal support for said members being spaced substantial distances from each other and arranged at different distances laterally of said truck, whereby to resist transverse movement of said body relative to said truck, said members comprising a telescoping cylinder and piston with a compression spring arranged between said piston and that end of said cylinder most remote from its point of pivotal connection, the cylinder being filled with a fluid for resisting relative movement of said piston and cylinder, and having a restricted by-pass means for regulating the movement of said fluid from one side of said piston to the other.

2. In a railroad truck the combination with a truck frame, of a bolster for supporting at least a portion of a train of cars, the ends of said bolster having portions extending outwardly from the sides of said truck frame, resilient, telescoping suspension devices on each side of the truck frame, each having one end thereof connected to the truck frame near the upper side thereof and the opposite end connected to the adjacent end of the bolster at a point at a substantial distance from said first point of support and outwardly from said first point of support, the resilient portions of said suspension devices being arranged between the points of support therefor, the truck being provided with at least two of said suspension devices on each side thereof with the lower ends of the suspension devices on the same side of the truck frame connected to the bolster through the intermediacy of an equalizer bar pivotally connected to said bolster and to said suspension devices.

3. In a railroad truck the combination with a truck frame, of a bolster for supporting at least a portion of a train of cars, the ends of said bolster having portions extending outwardly from the sides of said truck frame, resilient, telescoping suspension devices on each side of the truck frame, each having one end thereof connected to the truck frame near the upper side thereof and the opposite end connected to the adjacent end of the bolster at a point at a substantial distance from said first point of support and outwardly from said first point of support, the resilient portions of said suspension devices being arranged between the points of support therefor, the truck being provided with at least two of said suspension devices on each side thereof with the lower ends of the suspension devices on the same side of the truck frame connected to the bolster through the intermediacy of an equalizer bar pivotally connected to said bolster and to said suspension devices, said bolster having a substantially central support for at least one car of said train.

4. In a railway car truck, a framework comprising a side member having a central bolster opening and a bolster end projecting therethrough, an equalizer mounted on said bolster end outwardly of said side member, and a plurality of resilient connections between said equalizer and adjacent points of said side member, each of said resilient connections including a fluid cylinder, a piston operable therein, a spring-resisting movement of said piston in one direction and fluid means for snubbing the action of said piston in the other direction.

BRUNOLF C. BAADE.